United States Patent
Mestayer et al.

(10) Patent No.: US 8,863,568 B1
(45) Date of Patent: Oct. 21, 2014

(54) APPARATUS AND PROCEDURE TO CHARACTERIZE THE SURFACE QUALITY OF CONDUCTORS BY MEASURING THE RATE OF CATHODE EMISSION AS A FUNCTION OF SURFACE ELECTRIC FIELD STRENGTH

(75) Inventors: Mac Mestayer, Williamsburg, VA (US); Steve Christo, Gloucester, VA (US); Mark Taylor, Hampton, VA (US)

(73) Assignee: Jefferson Science Associates, LLC, Newport News, VA (US)

( * ) Notice: Subject to any disclaimer, the term of this patent is extended or adjusted under 35 U.S.C. 154(b) by 409 days.

(21) Appl. No.: 13/374,752

(22) Filed: Jan. 11, 2012

Related U.S. Application Data

(60) Provisional application No. 61/460,984, filed on Feb. 10, 2011.

(51) Int. Cl.
*G01B 5/28* (2006.01)

(52) U.S. Cl.
USPC .......................................................... 73/105

(58) Field of Classification Search
None
See application file for complete search history.

(56) References Cited

U.S. PATENT DOCUMENTS

2007/0158556 A1 * 7/2007 Ward et al. ................... 250/309

* cited by examiner

*Primary Examiner* — Robert R Raevis

(57) ABSTRACT

A device and method for characterizing quality of a conducting surface. The device including a gaseous ionizing chamber having centrally located inside the chamber a conducting sample to be tested to which a negative potential is applied, a plurality of anode or "sense" wires spaced regularly about the central test wire, a plurality of "field wires" at a negative potential are spaced regularly around the sense, and a plurality of "guard wires" at a positive potential are spaced regularly around the field wires in the chamber. The method utilizing the device to measure emission currents from the conductor.

19 Claims, 6 Drawing Sheets

APPARATUS AND PROCEDURE TO CHARACTERIZE THE SURFACE QUALITY OF CONDUCTORS BY MEASURING THE RATE OF CATHODE EMISSION AS A FUNCTION OF SURFACE ELECTRIC FIELD STRENGTH

This application claims the benefit of U.S. Provisional Application No. 61/460,984 filed on Feb. 10, 2011 for "An Apparatus and Procedure to Characterize the Surface Quality of Conductors by Measuring the Rate of Cathode Emission as a Function of Surface Electric Field Strength" incorporated herein by reference in its entirety.

The United States government may have certain rights to this invention under Management and Operating Contract No. DE-AC05-06OR23177 from the Department of Energy.

FIELD OF INVENTION

The invention relates to a device and method for verifying surface smoothness of conducting surfaces and is particularly useful for characterizing the surface quality of fine wires.

BACKGROUND OF INVENTION

Fine wires such as those used in high performance electronics applications are required to have a very smooth surface to perform within desired performance characteristics. Accordingly, inspection or determination of smoothness after manufacture and before the wire is utilized is highly desirable.

In the prior art the method of testing conducting surfaces, particularly fine wires, for high performance applications has been by visual inspection using a microscope. Typically a scanning electron microscope is used. Such inspection requires expensive equipment, as well as being time consuming and subject to human error as the observation and assessment is done by a human operator. Further, the human operator's assessment is a qualitative assessment based on visual observation and lacks a quantitative measurement for standardization or quantitative comparisons.

Accordingly, there is a need for a fast, non-invasive testing method for determining surface smoothness of conducting surfaces for high performance applications and preferably for a testing method that provides quantitative data reflecting surface smoothness. Additionally, in applications that involve electrical potentials on the conductive surface, there is a need to directly measure the surface emission of electrons rather than to measure the visual appearance of the surface as is typically done in the art as the visual appearance is a surrogate for the enhanced emission of electrons and it is the surface emission or leakage currents that are detrimental to performance.

SUMMARY OF INVENTION

In one embodiment the invention provides a device for determining surface smoothness of wires, the device comprises: a gaseous ionization chamber having a conducting wall; a test wire sample positioned in the gaseous ionizing chamber, the test wire sample has a test wire surface that is a cathode; a plurality of sense wires positioned in the gaseous ionizing chamber in predetermined positions around the test wire, each sense wire having a sense wire surface that is an anode; a plurality of field wires positioned in the gaseous ionizing chamber in predetermined positions around the sense wires; and a plurality of guard wires in the gaseous ionizing chamber in predetermined positions around the field wires. The field wires have a negative potential and the guard wires have a positive potential and the gaseous ionizing chamber contains an amplifying gas. The device is particularly useful for determining the surface smoothness of fine wire used in high performance applications.

The invention further provides a method for testing surface smoothness of wires using the device of the invention. The method is particularly useful for determining the surface smoothness of fine wire.

In one embodiment the invention provides a device for determining surface smoothness of a conductive surface, the device comprises: a gaseous ionization chamber, the gaseous ionization chamber including a conducting wall; a test sample comprising a conductive surface in which the conductive surface is a cathode positioned in the gaseous ionizing chamber; a plurality of sense wires positioned in the gaseous ionizing chamber in predetermined positions around the test sample, each sense wire having a sense wire surface that is an anode; a plurality of field wires positioned in the gaseous ionizing chamber in predetermined positions around the sense wires; and a plurality of guard wires in the gaseous ionizing chamber in predetermined positions around the field wires. The field wires have a negative potential and the guard wires have a positive potential.

DETAILED DESCRIPTION OF INVENTION

Figure 1:
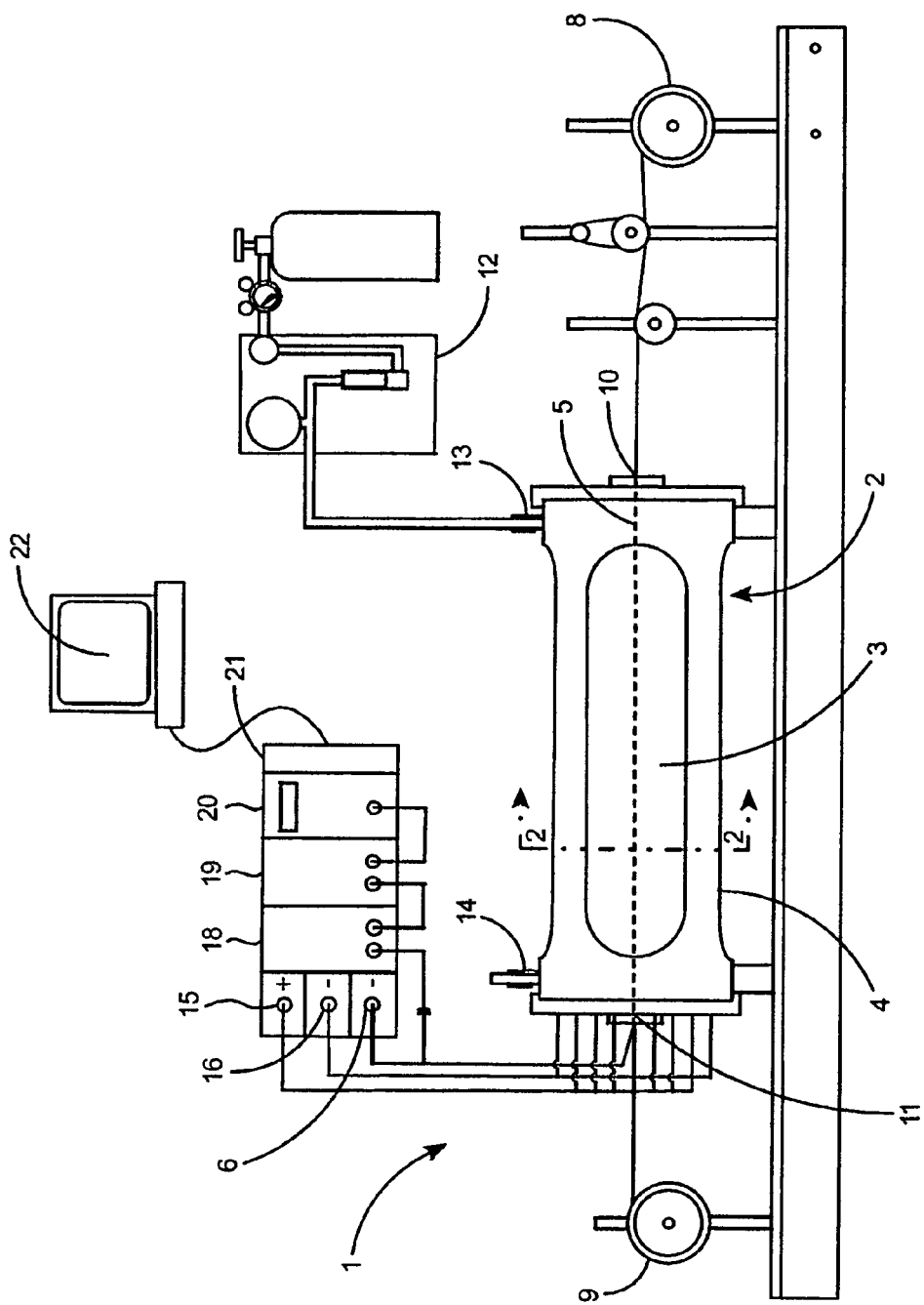
FIG. 1 is a schematic diagram of one exemplary embodiment of the gaseous ionizing wire chamber and associated electronics of the invention.

The present invention includes a device and method for determining or verifying surface smoothness of a conducting surface and is particularly useful for determining the surface smoothness of a wire such as a fine wire used in high performance applications. The device employs a gaseous ionizing chamber in which a test sample with conductive surface is placed for testing. The method utilizes the device of the invention and employs a fast, non-invasive testing process.

In contrast to the prior art which employs microscopic analysis, the present device and method provides a number of advantages. The advantages of the present device and method include: providing a quantitative test whereby a particular test sample can be categorized by a numerical quality factor, eliminating the subjectivity and/or fatigue associated with a human operating a microscope; providing the option of employing a continuous testing procedure instead of the batch sampling procedure most commonly used with scanning electron microscopes; being rapid and taking substantially less time than visual inspection using an electron microscope; and utilizing simpler, less expensive instrumentation than electron microscopy techniques. Further the present method and device is directly sensitive to functional flaws caused by impaired surface quality in the test sample. Namely, in the testing device of the invention an increase in electron emission from the test wire surface occurs when voltage is applied to a test wire with impaired surface quality.

As the device of the invention is particularly useful for testing the surface quality of wires, particularly of fine wires, the device will be described below in terms of a fine wire test sample. As used herein the term "fine wire" should be taken to mean a wire having a diameter of less than about 2000 microns. However as one skilled in the art will appreciate it is equally applicable to wires of a larger diameter and other conductive surfaces that can be positioned within the device of the invention.

More particularly, the device of the invention includes a gaseous ionizing wire chamber with the conductive sample to be tested, referred to as the "test sample" located centrally in the chamber. A negative potential is applied to the test sample and the test sample surface becomes a cathode surface. A plurality of anode wires (referred to hereinafter as "sense wires") are spaced regularly about the central test sample. The sense or anode wires deliver signal to on-chamber electronics. Surrounding the sense wires and spaced regularly around the sense wires in the chamber are a plurality of field-forming "field wires" which are run at negative potential. These field wires are themselves surrounded by further field-forming positive potential "guard wires" spaced regularly around the field wires in the chamber. The guard wires are proximate to the conductive walls of the chamber.

Surface irregularities present on the test sample give rise to electron emission currents. The emission currents are amplified in the chamber. These emission currents are proportional to the number of surface irregularities on the test wire and to the inverse of characteristic radii of the irregularities.

The inventors believe without wishing to be held to the theory that three operating principles are fundamental to the operation of the device. The first principle of operation is that the electron emission current from a conductive surface held at a high value of negative surface electric field strength is a good measure of the density of defects on the surface of the conductor in question.

In the case of an exemplary embodiment of the present invention the conductor test sample is a test wire. Even for poor quality surfaces, the magnitude of the emission currents is very small and difficult to measure using standard electronic amplification devices. The operation of the device of the invention relies on the inherent large amplification and good signal to noise characteristics of the gas amplification of a wire chamber. The anode (or "sense") wires collect the electrons which are emitted from the test wire surface, and by virtue of the small diameter of the anode wires, allow significant gas amplification of the electric current. The signal is further amplified and discriminated to eliminate noise from electromagnetic interference, and the resulting discriminator output rate is measured using a counting scaler (i.e. the output is the digital measurement of counting rate and not the analog measurement of current.). As the counting rate of the discriminated signal is inversely proportional to the surface quality, quantitative data is obtained that characterizes surface quality of the test wire.

The second major operating principle is that by virtue of using the inherent high gas gain (amplification factor due to the gas in the chamber) of an anode or signal wire, the device has greater discrimination between good and bad surface quality than a device which relies on an external ammeter to measure the value of the emission current.

In a preferred embodiment, the device relies upon standard cross-capacitance formulas and calculations (i.e. an algorithm) for selecting the proper operating voltage of the test, sense, field and guard wires in order to keep a constant gas gain (determined by the electric field strength at the sense wire surface), to keep a low electric field at the surface of the field wires, and to vary the electric field at the surface of the wire to be tested in pre-determined steps.

Third major operating principle is to keep the gas gain constant and to keep the surface electric fields on the "field" and "guard" wires low in order to reduce any background inherent to the device itself.

FIG. 1 shows a schematic diagram of one exemplary embodiment of the gaseous ionizing wire chamber and associated electronics 1 of the device invention. The device comprises a gaseous ionizing wire chamber 2 with a chamber interior 3 and chamber wall 4. The chamber wall 4 is a double walled, sealed, conducting, grounded, gas bag. Gas is supplied to the chamber wall 4 via a gas supply system 12 through gas inlet 13 and can be removed via gas outlet 14. Preferably the gas supply system 12 should provide for quick purge and steady operation. The gas is an amplifying gas. As used herein, an "amplifying gas" is a mixture of an inert gas (one that is chemically inert and will not react with the wires or other materials) and an admixture of a "quenching gas" which has the property that it is very absorptive of ultra-violet light, which is emitted during the gas amplification process, and, if not absorbed, can strike the test wire emitting more electrons and beginning a feedback process which leads to a very large current, sometimes called a "glow discharge". In a preferred embodiment, the oxygen content is kept below a part per thousand to limit the oxygen's ability to capture the drifting electrons and prevent the amplification. A mixture of argon and carbon dioxide is exemplary of a suitable amplifying gas.

The test wire 5 passes from the exterior of the chamber 2 into the chamber interior 3, is centrally located in the chamber interior 3, and is in communication with the test wire power supply 6 that applies a negative potential to the test wire 5. In an exemplary embodiment, the power supply provides up to about −3500 V. Gas seals 10,11 permit the test wire 5 to be fed in to the chamber interior 3 while maintaining amplifying gas in the chamber interior 3. The gas seals 10,11 are preferably flexible and provide a tight seal while allowing the test wire 5 to move though the seals 10,11. (Note only the test wire 5 is shown in the chamber interior 3 in the schematic FIG. 1, further details regarding the components included in the chamber interior 3 are provided in FIGS. 2 and 3 and discussed below.)

Referring again to FIG. 1, optionally, the test wire 5 may be fed through the chamber interior 3 by means of a wire spooling system 8,9. This permits testing over a length of test wire 5 in a continuous mode.

Although not shown in FIG. 1, the chamber interior 3 also contains a plurality of sense wires, a plurality of field wires and a plurality of guard wires. A positive voltage is applied to the sense wires and guard wires via a positive power supply 15 and a negative voltage is applied to the guard wires via a negative power supply 16. Preferably the power supplies 15, 16 operate in a range of up to about +/−3500V.

The exemplary embodiment shown in FIG. 1 further comprises electronics including an amplifier 18, discriminator 19, scaler 20, controller 21 and a computer with software 22. The amplifier 18 amplifies small signals. For example, in one exemplary embodiment, the amplifier has a gain of about 2 mV/μA. The discriminator 19 eliminates noise from electromagnetic interference and provides a threshold for counting. In one exemplary embodiment the discriminator has an NIM output and 10 mV threshold. (As used herein, 'NIM' means in accordance with the NIM standard. The NIM (i.e. Nuclear Instrumentation Module) standard was defined by the U.S. Atomic Energy Commission's report TID-20893 in 1968-1969 and most recently revised in 1990 (DOE/ER-0457T) and provides a common footprint for electronic modules (i.e. amplifiers, ADCs, DACs, discriminators, etc.)). The scaler 20 records and displays the output of the discriminator as a counting rate. In one exemplary embodiment the counting rate of the scaler 20 is capable of recording data at a rate of up to megahertz rates. The computer with software 22 determines and controls the voltages to the test wire 5, sense wire, field wires and guard wires.

Figure 2:
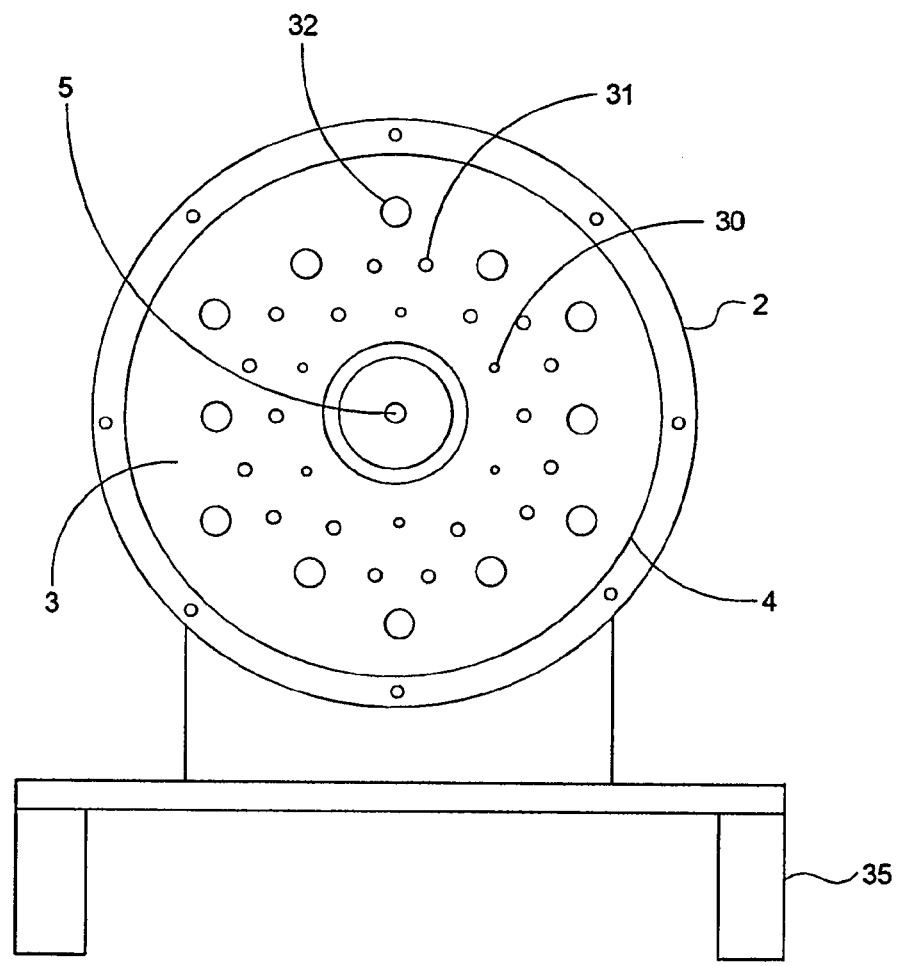
FIG. 2 is a cross sectional diagram of one exemplary embodiment of the gaseous ionizing wire chamber of the invention.

FIG. 2 is a cross sectional diagram of the gaseous ionizing wire chamber 2. The gaseous ionizing wire chamber 2 has a chamber interior 3 and a chamber wall 4. The chamber interior 3 contains an amplifying gas. The chamber wall 4 is a sealed double walled, conducting, grounded gas bag. The test wire 5 is positioned in the center of the chamber interior 3 and immersed in the amplifying gas. In the embodiment shown in FIG. 2, the test wire 5 is surrounded by six (6) sense wires 30 evenly spaced at predetermined positions around the test wire 5. The sense wires 30 are surrounded by eighteen (18) field wires 31 evenly spaced at predetermined positions around the sense wires 30. As shown in FIG. 2 the field wires 31 are positioned around the six sense wires 30 in a six-fold symmetric arrangement. The field wires 32 are surrounded by twelve (12) guard wires 32 evenly spaced at predetermined positions in a six-fold symmetric arrangement. The test wire 5, sense wires 30, field wires 31 and guard wires 32 are sealed in the chamber interior 3 by the chamber wall 4. In the embodiment shown in FIG. 2, the gaseous ionizing wire chamber 2 is held in position by chamber support 35.

The invention also provides a method of testing a fine wire for surface smoothness. The method is based on utilizing the device of the invention to count the number of electrons emitted per second from the surface of the test wire. The test wire's surface quality is characterized by a plot of the rate of emitted electrons from the test wire surface as a function of the surface electric field of the test wire surface.

The wire to be tested is positioned in the gaseous ionizing chamber along the central axis of the device. Optionally, a length of test wire many times longer than the chamber can be tested by feeding the test wire through the chamber during operation. For example, a wire greater than a meter in length can be tested in a single continuous operation by feeding the wire through the chamber and making a series of measurements. Alternatively, selected portions of a long wire can be tested without cutting samples from the long wire by feeding the wire through the device and making measurements at selected positions.

The test wire is immersed in amplifying gas in the chamber interior and a negative potential is applied to the test wire forming a cathode surface at the surface of the test wire. Electrons are emitted from the surface of the test wire. The electrons thus emitted create a signal in the small diameter sense wires which are operated at a positive potential (i.e. the sense wires are anodes). Accordingly the sense wires produce a signal that is amplified as compared to the electron emission from the surface of the test wire. The sense wires are surrounded by field wires operated at a negative potential and the field wires are surrounded by guard operated at a positive potential.

The test, sense, field and guard wire voltages are independently adjusted so as to keep the surface electric field of the sense (i.e. anode) wires constant (thus keeping the gas gain constant) while varying the surface electric field of the test wire which is the independent variable. In this way the emission characteristics of the field wires are changed while keeping the gas amplification constant. Preferably, the field at the field wire surfaces is kept approximately constant, and is very low, preferably below approximately 8 kV/cm, so electron emission from the field surfaces is negligible compared to emission from the test wire surface. In one embodiment, the surface electric field of the test wire is varied in a predetermined series of steps of field strengths. Computer control utilizing an algorithm can be used to determine and adjust voltages on the test, sense, field and guard wires.

The signal generated and amplified by the device is transmitted to a discriminator and recorded and measured using a counting scaler. The test data is plotted as count rate versus test wire surface field. Calibration plots are prepared from sample fine wires known to have very smooth surfaces. Test plots from samples to be tested can be compared to the known plots and count rate versus test cathode surface field plots which deviate significantly from the calibration standards are indications of surface quality problems in the test wire. Typically, the plot of count rate verses cathode surface field shows an approximately constant value of count rate versus test wire surface field value until some characteristic field value at which point the counting rate rises exponentially with rising field value.

Typically, the characteristic field value at which the counting rate begins to rise exponentially with field value, called "Ecrit", is significantly higher for a "good" wire (i.e. wire with a smooth surface) than for a "bad" wire (i.e. a wire with surface defects). Thus, the surface quality of fine wire may be quantified as the value of "Ecrit" as measured by the device of the invention. In addition, because the test wire is surrounded by more than one anode wire (in one exemplary embodiment, six anode or sense wires), azimuthal asymmetry in the counting rate which is characteristic of certain types of flaws in wire manufacture involving the forming die may be observed as well.

As described herein the invention has been described in terms of characterization of surface quality of fine wires however, cathodic emission is a characteristic feature of conducting surfaces. Accordingly the device and method described herein can be applied to characterization of surface finish of any object with a conductive surface that could be suitably positioned in a test chamber such as the one described herein.

Example 1

The following example is provided for illustrative purposes. A gaseous ionizing wire chamber as described above was constructed. A test wire, sense wires, field wires and guard wires were positioned in the interior of the chamber. The test wire was surrounded by six sense wires evenly spaced at predetermined positions around the test wire. The sense wires were surrounded by eighteen (18) field wires evenly spaced at predetermined positions around the sense wires in a six-fold symmetry arrangement. The field wires were surrounded by twelve (12) guard wires evenly spaced at predetermined positions in a six-fold symmetric arrangement. The test wire, sense wires, field wires and guard wires were sealed in the chamber interior by the chamber wall. A 140 micron diameter Gold-plated Copper wire was used to form the field and guard wires. A 30 micron diameter Gold-plated Tungsten wire was used to form the sense wires. For Example 1, an 80 micron diameter Gold-plated Copper wire was used as the test wire.

For the tests of Example 1, an algorithm was used to calculate voltages needed for the four types of wires (i.e. guard, field, sense and test wires) to hold a constant electric field of about 198.9 kV/cm on the sense wire surface and a field of 10 kV/cm on the test wire surface while keeping the surface fields on the guard and field wires to approximately constant levels below 8 kV/cm. This voltage combination was designated as "step 1" or the first data collection point. Ten data collection points were used in the tests of Example 1 with ten predetermined selected values for the surface field on the test wire.

Similarly, the four voltages needed for the four types of wires (guard, field, sense and test) for step 2 in which the test wire surface field was 20 kV/cm, the sense wire surface field was about 198.9 kV/cm, and the surface field on the guard and field wires of less than 8 kV/cm were calculated and adjusted. In similar fashion, voltages calculations and adjustments were made for eight more steps (i.e. steps "3" through "10") in which the test wire had a had voltages of 30, 40, 50, 60, 70, 80, 90 and 100 kV/cm, respectively, while the sense wire surface field was held constant at about 198.9 kV/cm and the guard and field wire surface fields were held below 8 kV/cm. At each step (i.e. each of the selected test wire fields, the counting rate was recorded for a 30 sec. interval for emission from the sample test wire.)

For the specific geometry and specific diameter (80 μm) for the test wire of the embodiment of Example 1, the distribution of electric field lines was calculated using the GARFIELD program. (Garfield is a publicly-available set of programs which calculates electric fields and other properties of wire chamber devices used in particle-physics experiments written by Rob Veenhof, (See http://garfield.web.cern.ch/garfield/.) The diagrams of FIGS. 3a, 3b, and 3c, respectively, show the calculated electric field line distributions when the test wire's surface field is 20, 60 or 100 kV/cm, respectively. The field line density into the six signal wires stays essentially constant, a visual indication that the gains are constant, while the field line density emanating from the central test wire increases in the ratio of 20:60:100 for FIGS. 3a, 3b, and 3c, respectively, consistent with the calculated surface fields. These three configurations correspond to the test points 2, 6 and 10 in the "test results" shown in FIG. 4.

For illustrative purposes two tests results are provided: one on a sample of "good" wire from a carefully handled spool of 80 micron Gold-plated Copper wire which had been independently tested by a scanning electron microscope and verified to have a good surface quality and the other on a "bad" sample of wire from the same spool, which had been abraded to roughen the surface.

Figure 4:
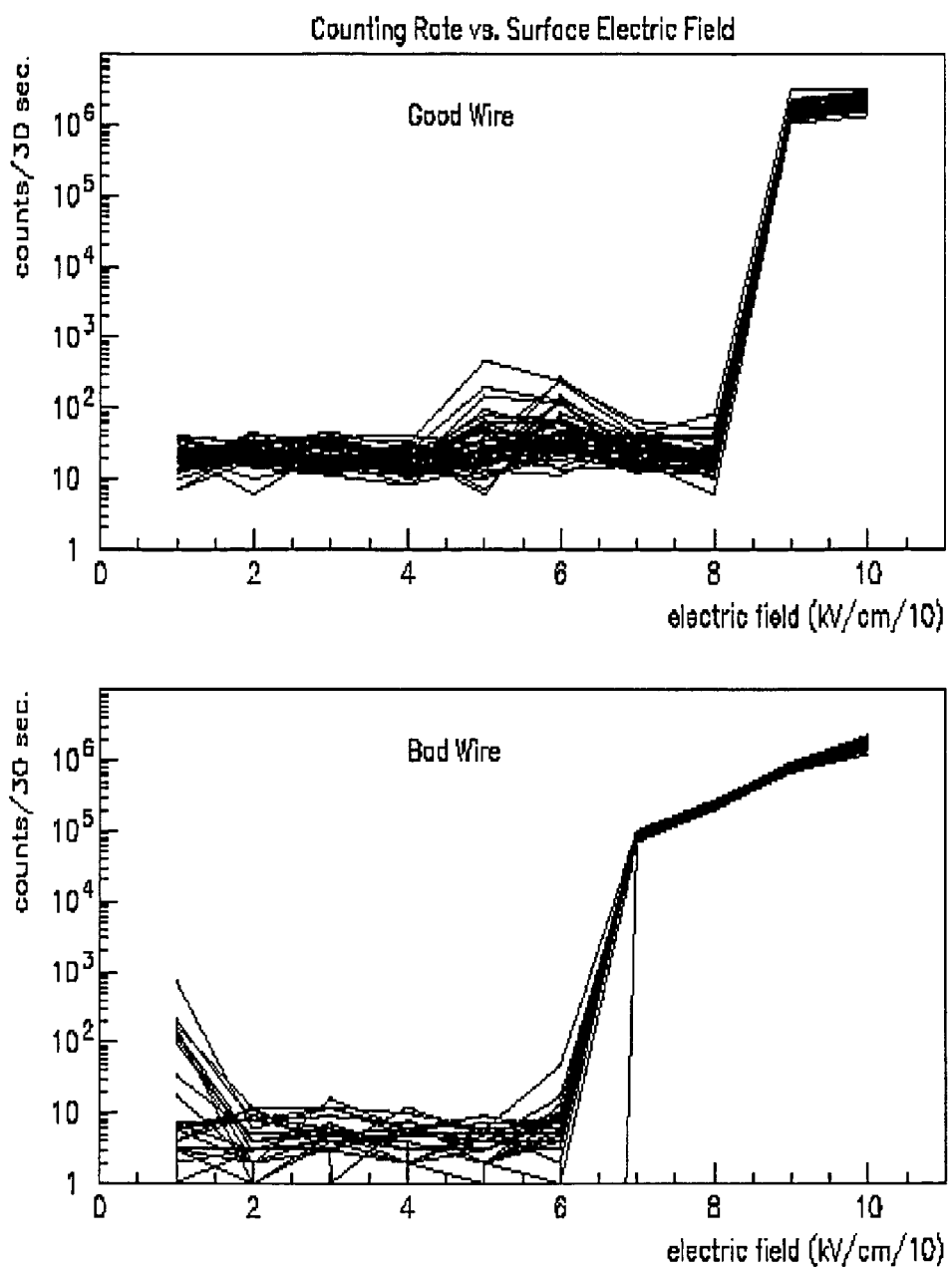
FIG. 4 shows test data for two wires tested in one embodiment of the device of the invention; labeled "good" and "bad" respectively, based upon their visual appearance in an electron scanning micrograph.

A plot was made of counting rate versus electric field at the test wire surface and the results are shown in FIG. 4. The top portion of FIG. 4 shows the results for the "good" wire; and the bottom portion of FIG. 4 shows the results for the "bad" wire. The various lines show the values for the six independent "sense" wire signals aggregated over a number of repeated trials. Both curves show an approximately constant value of count rate versus test wire surface field value until some characteristic field value at which point the counting rate rises exponentially with rising field value (note the logarithmic vertical scale). The characteristic field value at which the counting rate begins to rise exponentially with field value, called "Ecrit", is significantly higher for the "good" wire than for the "bad" wire. For the wire tested in example 1, the "Ecrit" is approximately 80 kV/cm for the "good" wire sample and about 60 kV/cm for the "bad" wire sample. Thus, quantitative data related to wire surface quality was obtained.

Figure 3A:
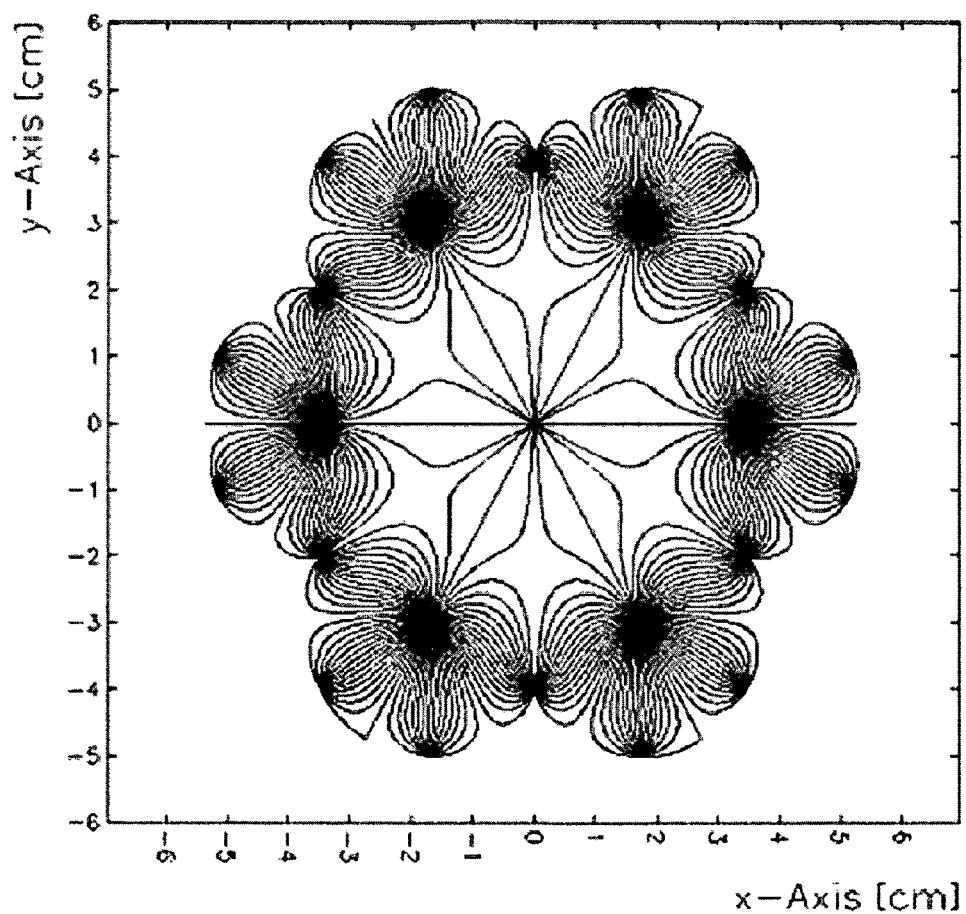
in FIG. 3a the test wire's surface field is 20 kV/cm, in FIG. 3b the test wire's surface field is 60 kV/cm, and in FIG. 3c the test wire's surface field is 100 kV/cm.
Figure 3B:
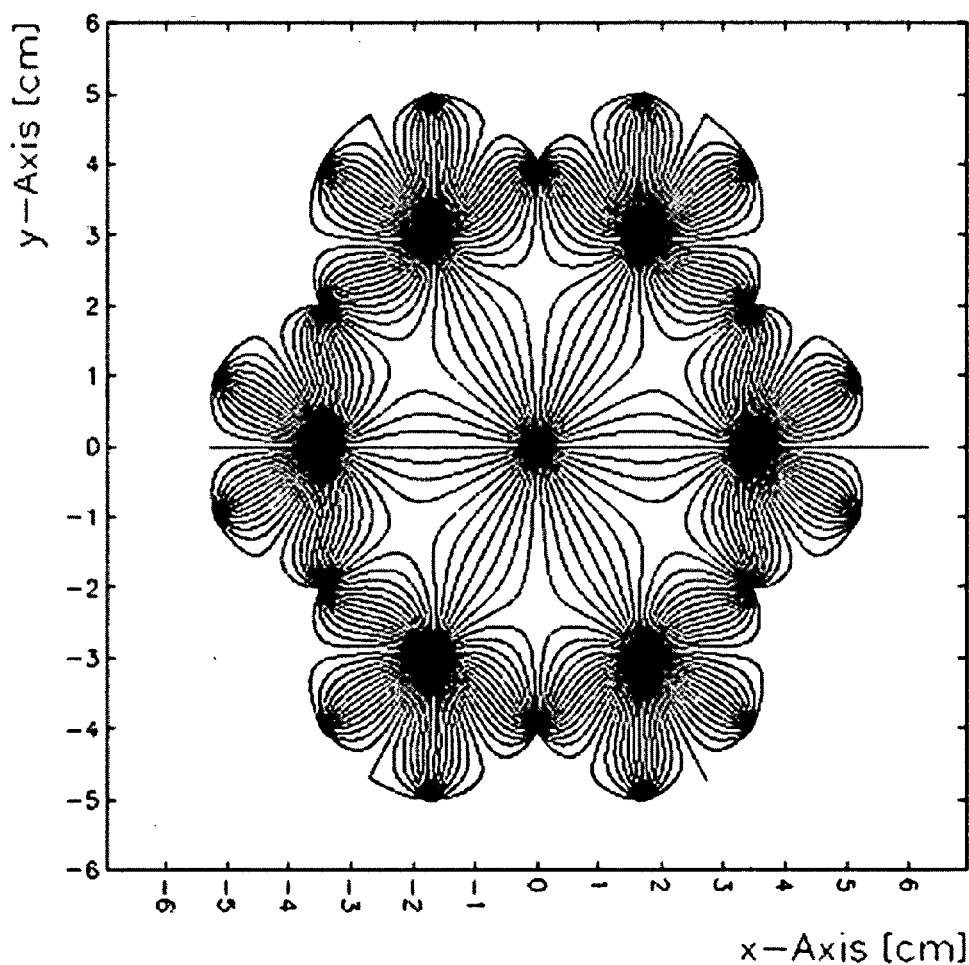
FIG. 3 is a diagram showing electric field line distributions in the interior of an exemplary embodiment of the gaseous ionizing wire chamber at three different test wire potentials.
Figure 3C:
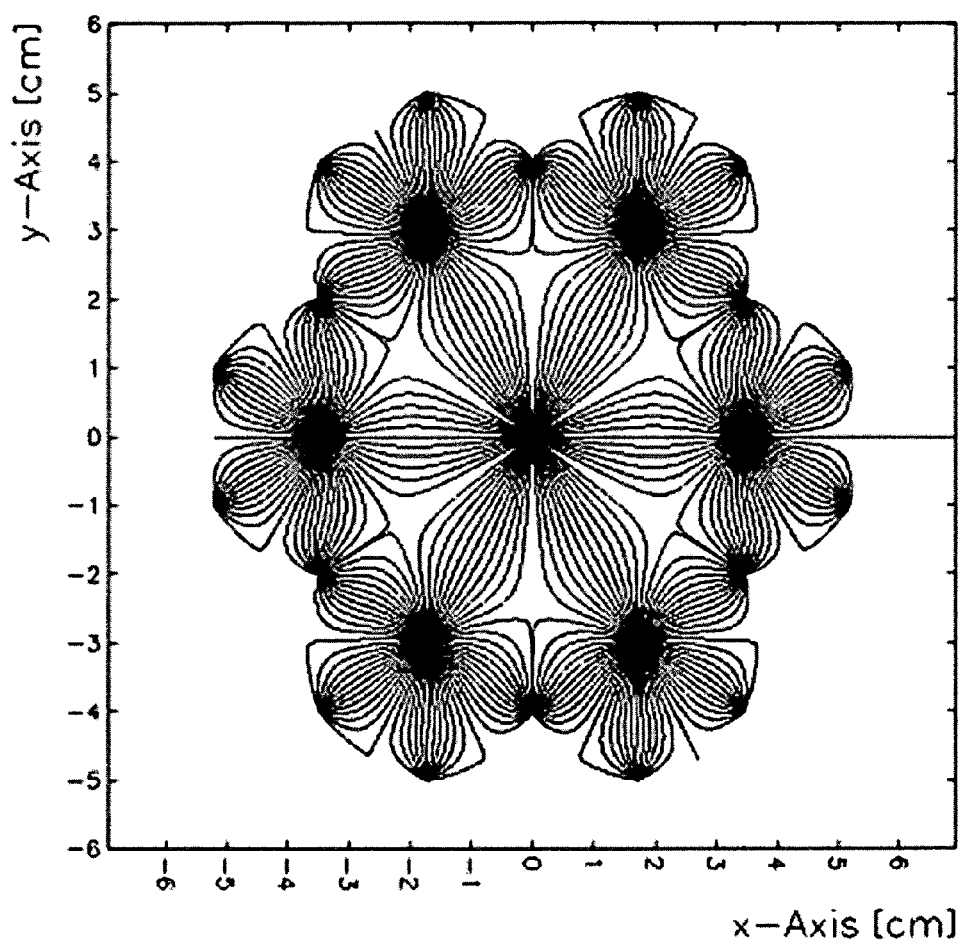

Again, note that test points 2, 6, and 10 correspond to the fields shown in FIGS. 3a, 3b, and 3c, respectively.

What is at present considered the preferred embodiment and alternative embodiments of the present invention has been shown and described herein. It will be obvious to those skilled in the art that various changes and modifications may be made therein without departing from the scope of the invention as defined by the appended claims.

What is claimed is:

1. A device for determining surface smoothness of wires, the device comprising:
   a. a gaseous ionization chamber, the gaseous ionization chamber including a conducting wall;
   b. a test wire sample positioned centrally In the gaseous ionizing chamber and wherein the test wire sample has a test wire surface that is a cathode;
   c. a plurality of sense wires positioned in the gaseous ionizing chamber in predetermined positions around the test wire and wherein each sense wire has a sense wire surface that is an anode;
   d. a plurality of field wires positioned in the gaseous ionizing chamber in predetermined positions around the sense wires; and
   e. a plurality of guard wires in the gaseous ionizing chamber in predetermined positions around the field wires.

2. The device of claim 1 wherein the field wires have a negative potential and the guard wires have a positive potential.

3. The device of claim 1, wherein the gaseous ionizing chamber contains an amplifying gas.

4. The device of claim 3, wherein the amplifying gas is a mixture of argon and carbon dioxide.

5. The device of claim 1, wherein the sense wires receive a plurality of electrons from the test wire and produce a signal.

6. The device of claim 5, therein the device further comprises a discriminator and wherein the signal is transmitted to the discriminator and the discriminator has an output.

7. The device of claim 6 further comprising a counting scaler for recording and displaying the output.

8. The device of claim 1 further comprising an algorithm for determining an operating voltage for the test wire, the sense wires, the field wires and the guard wires.

9. The device of claim 8, wherein the algorithm determines operating voltages that maintain a constant sense wire electric field at the sense wire surface and a test wire electric field at the surface of the test wire wherein the test wire electric field is changeable in pre-determined steps.

10. A method for determining surface smoothness of fine wires, the method comprising:
   a. providing a device, the device comprising a gaseous ionization chamber, the gaseous ionization chamber including a conducting wall; a test wire sample positioned in the gaseous ionizing chamber and wherein the test wire sample has a test wire surface that is a cathode; a plurality of sense wires positioned in the gaseous ionizing chamber in predetermined positions around the test wire and wherein each sense wire has a sense wire surface that is an anode; a plurality of field wires positioned in the gaseous ionizing chamber in predetermined positions around the sense wires; and a plurality of guard wires in the gaseous ionizing chamber in predetermined positions around the field wires wherein the sensing wires receive a plurality of electrons from the test wire and produce a signal;
   b. applying a voltage independently to each of the test wire, the sensing wires, the field wires and the guard wires;

c. adjusting the voltages independently to the test wire, the sensing wires, the field wires and the guard wires to form a constant sense wire electric field at the surface of the sense wire and a changeable, predetermined test wire electric field at the surface of the test wire; and d. measuring the signal.

11. The method of claim 10 wherein the field wires have a negative potential and the guard wires have a positive potential.

12. The method of claim 10, wherein the gaseous Ionizing chamber contains an amplifying gas.

13. The method of claim 10 wherein the signal is transmitted to a discriminator and the discriminator produces a discriminator output signal.

14. The method of claim 13 wherein the discriminator output signal is measured and recorded using a counting scaler.

15. The method of claim 10 wherein each field wire has a field wire surface and a field wire surface electric field is formed at the field wire surface and wherein the field wire surface electric field is maintained essentially constant and below about 8 Kv/cm.

16. A device for determining surface smoothness of a conductive surface, the device comprising:

a. a gaseous ionization chamber, the gaseous ionization chamber including a conducting wall;

b. a test sample comprising a conductive surface positioned in the gaseous ionizing chamber and wherein the conductive surface is a cathode;

c. a plurality of sense wires positioned in the gaseous ionizing chamber in predetermined positions around the test sample and wherein each sense wire has a sense wire surface that is an anode;

d. a plurality of field wires positioned in the gaseous ionizing chamber in predetermined positions around the sense wires; and e. a plurality of guard wires in the gaseous ionizing chamber in predetermined positions around the field wires.

17. The device of claim 16 wherein the field wires have a negative potential and the guard wires have a positive potential.

18. The device of claim 16, wherein the gaseous ionizing chamber contains an amplifying gas.

19. The device of claim 6 wherein the sense wires receive a plurality of electrons from the test sample conductive surface and produce a signal.

* * * * *